Oct. 9, 1956  R. R. WALTON  2,765,514
APPARATUS FOR TREATING TEXTILE MATERIALS
Original Filed Dec. 9, 1954  15 Sheets-Sheet 6

Inventor
Richard R. Walton
Atty.

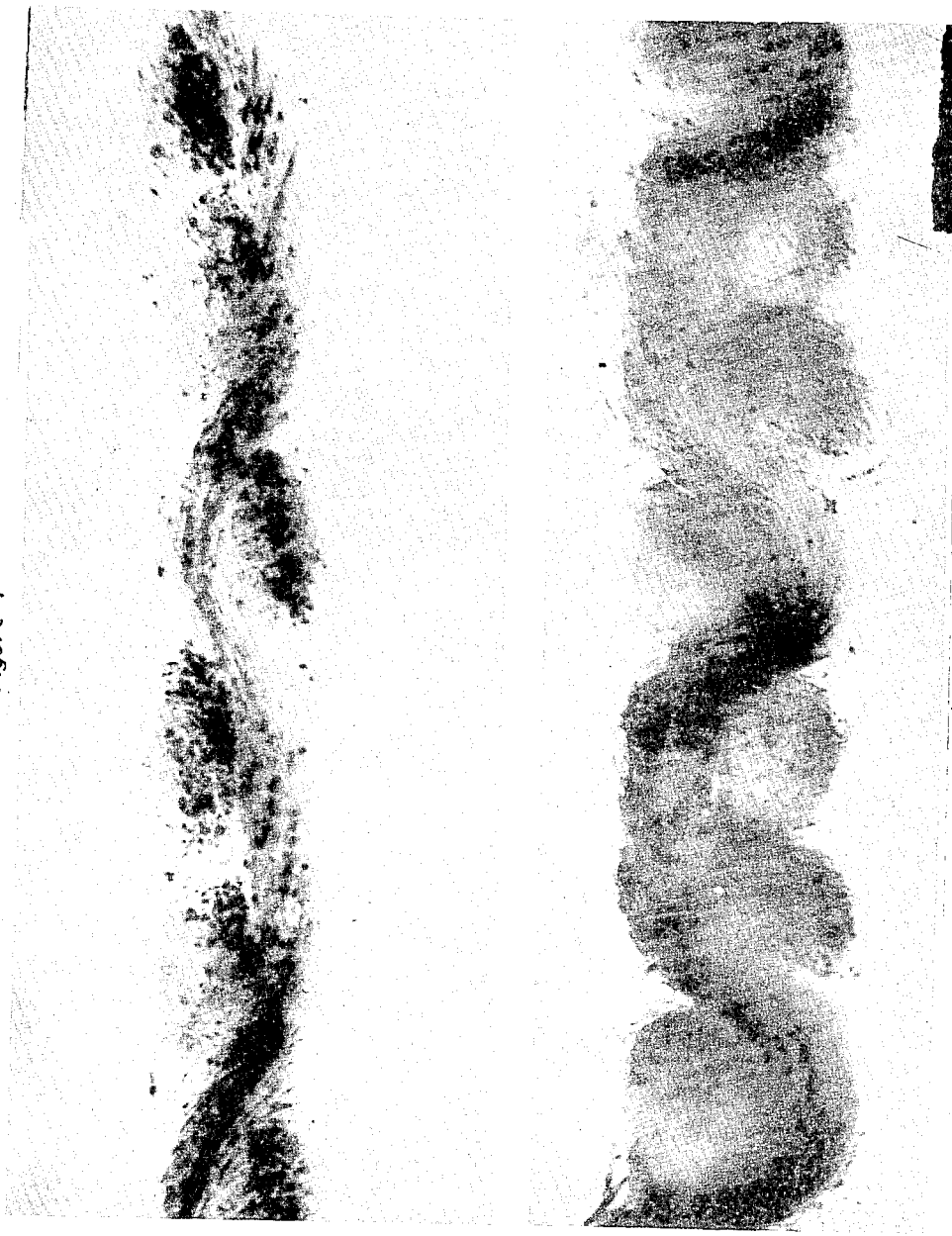

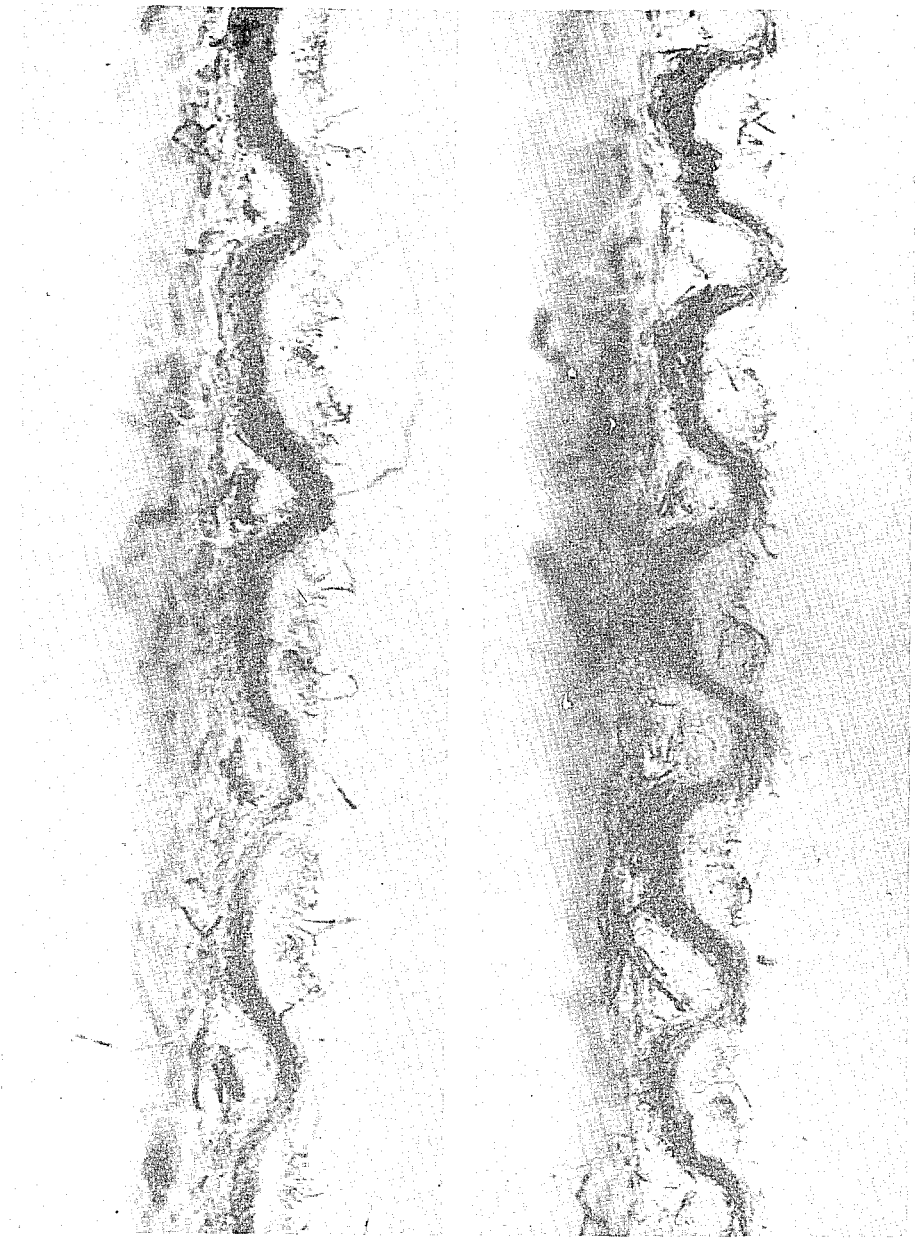

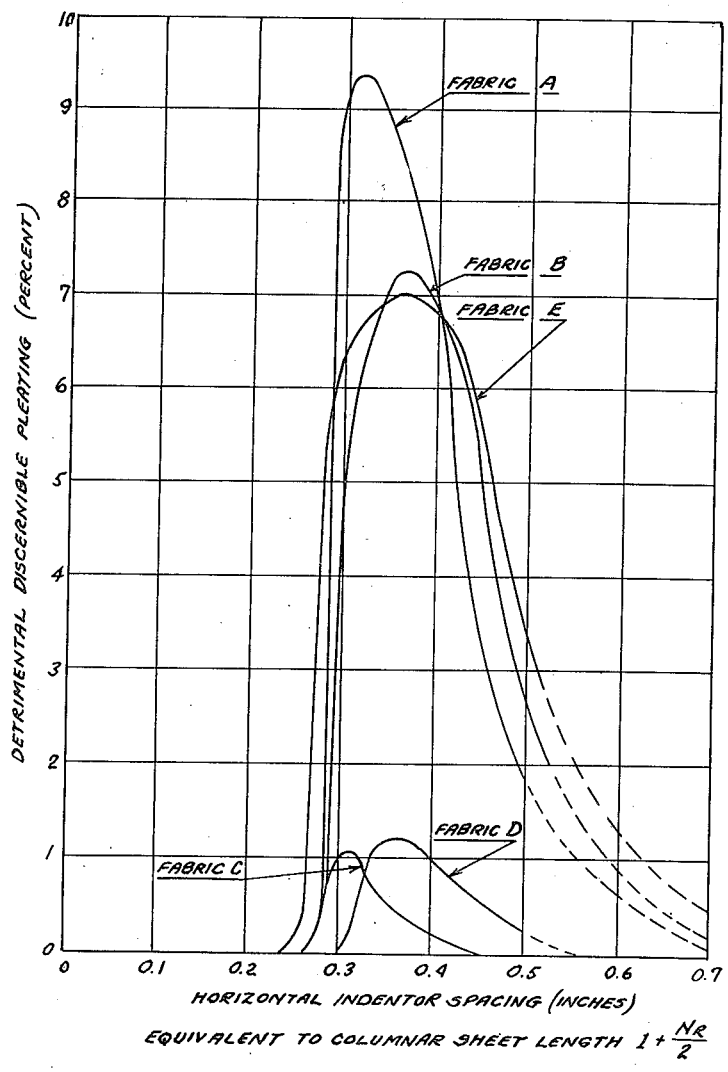

Oct. 9, 1956  R. R. WALTON  2,765,514
APPARATUS FOR TREATING TEXTILE MATERIALS
Original Filed Dec. 9, 1954  15 Sheets-Sheet 13

INVENTOR.
BY Richard R. Walton
Attorney

United States Patent Office 2,765,514
Patented Oct. 9, 1956

2,765,514

APPARATUS FOR TREATING TEXTILE MATERIALS

Richard R. Walton, Boston, Mass.

Original application December 9, 1954, Serial No. 474,136. Divided and this application July 28, 1955, Serial No. 529,421

17 Claims. (Cl. 26—18.6)

This application is a division of my copending application, Serial No. 474,136, filed December 9, 1954.

This invention relates, in general, to textile materials and to techniques and mechanisms for treating fabrics of various classes in order to modify certain textile characteristics of these fabrics and their constituent yarn portions and, specifically, to control and stabilize the residual shrinkage of fabrics within commercially acceptable limits.

Commercial use of conventional mechanical shrinkproofing has, in general, been limited in its application to woven cotton fabrics. In the case of woolen goods, viscose type fabrics, acetate type fabrics, as well as knitted fabrics and fabrics woven or knitted from mixtures of various other type synthetic fibers, limited if any mechanical preshrinking can be successfully carried out. It is well known to those skilled in the art that these limitations are due very largely to fiber content, nature, organization and structural arrangement of the fabrics.

For example, an immediate problem arises in attempting to exert on a fabric a compacting force of such magnitude that a lengthwise compaction sufficient to impart a commercially acceptable amount of resistance to shrinkage is achieved. The exertion of compressional forces of this magnitude will result in the dissipation of the concomitant strains by a buckling of the fabric—only a portion, if any, of the strain will be a true compressive deformation in the direction of the length of the fabric. A large portion of the compacting force thus applied will cause buckling to develop to a point where the fabric begins to fold over upon itself along spaced lines of folding and fabric pleating appears with resulting loss in compaction.

Heretofore, to my knowledge, the formation of pleats resulting from buckling has been avoided in only two ways. First, the applied force has been allowed to act over so great a length of fabric that, even if local buckling occurs, such buckling cannot manifest itself in detrimental pleating. However, while this avoids the detrimental pleating problem, the results are unsatisfactory because the compressive strains are so reduced with the increase in the fabric area over which the force is permitted to act that commercially acceptable residual shrinkage is not achieved.

The other attempt to overcome the buckling problem was to provide mechanical opposition to buckling, i. e., by locating rigid surfaces in close proximity to both sides of the fabric, thereby forming a confined zone of compacting action. This proves impractical because such a mechanical support against buckling is ambiguous and indeterminate and still permits dissipation of applied compressive strains over such a long fabric length that a commercially acceptable residual shrinkage is not achieved.

The present invention has been occasioned by a long study of and familiarity with these problems of shrinkproofing and has, as a general object, the evolving of an entirely different approach from which there may be derived commercially feasible techniques and mechanisms for carrying out adequate preshrinking of fabrics, regardless of the type of fiber employed or the method by which these fibers are fabricated. The invention further aims to deal specifically with the above-noted problems of fabric buckling and fabric pleating and to devise means for exerting on a fabric a compacting force of such magnitude that there is achieved a lengthwise compaction sufficient to impart a commercially acceptable amount of resistance to shrinkage.

According to this invention, a method is contemplated in which a fabric is caused to absorb, wholly in the direction of its length, without discernible detrimental pleating, compressional strains sufficient to compact the fabric to acceptable shrinkage standards. The compressional strains are exerted by the application of forces which are great enough to create necessary compression but are still less than those which can cause buckling of that portion of the fabric being acted upon at any one time, unaided by the support of any lateral mechanical props against buckling adjacent to the zone of compaction.

The nature of the invention and its other objects will be more fully understood and appreciated from the following detailed description which is based, in part, upon an important observation set forth below.

In compacting fabrics, the general assumption that the tendency to detrimental, discernible pleat formation increases with diminishing length of the fabric being acted upon does not hold for the funtion $l$ approaches 0, where $l$ is the short length of fabric being acted upon by the compressional forces. On the contrary, while the tendency to detrimental discernible pleat formation is 0 for a relatively long length $l$, it can be understood that it must also be 0 when $l$ equals 0, since for 0 lengths buckling cannot occur. It follows, then, that at some intermediate value of $l$ the tendency to detrimental discernible pleat formation reaches a maximum and thereafter decreases as $l$ approaches 0. A curve plotting tendency to discernible detrimental pleat formation versus $l$ is an asymmetrical bell-shaped curve similar to those shown in Fig. 11. Furthermore, for some fabrics at least, an important characteristic of this bell-shaped curve is that the curve falls away from its peak very abruptly on the side where pleating decreases as $l$ approaches 0, thus denoting that a point or region of criticality exists.

Taking advantage of my observation of the characteristics expressed by such a curve, my basic concept of invention is to operate below the point of region of criticality noted and in that portion of the curve where, as $l$ approaches 0, the tendency to detrimental discernible pleat formation is decreasing or has disappeared, rather than in that portion of the curve where, as $l$ increases in magnitude, the tendency to detrimental discernible pleat formation is decreasing.

As an additional observation, I have noted that curves which plot extent of compaction versus length $l$ attain maximum values of compaction within the range of $l$ where the tendency to detrimental discernible pleat formation is decreasing as $l$ approaches 0. Therefore, to achieve commercially acceptable fabrics which simultaneously manifest satisfactory surface characteristics and residual shrinkage properties, I choose a preferred value of $l$ such that detrimental discernible pleat formation does not exist to any appreciable extent and compaction is aproximately at a maximum. This preferred value of $l$ represents an extremely short length of fabric which is believed to act as a "columnar sheet" held at two ends, even though unsupported on either surface area therebetween. The term "columnar sheet," as employed in this application, is intended to define a fabric piece of finite area having a length and width wherein the length $l$ is, for a given fabric, sufficiently short to provide adequate columnar resistance to avoid buckling to the point of discernible pleating and thus minimize force losses through their dissipation by absorption in directions other than the length direction of the fabric.

The concept of solving the problem of adequate preshrinkage by mechanically compacting thus described is thus wholly different in that it relies upon a critical minimum length of material being acted upon. Nor is this concept of compacting obvious because, as the curve (Fig. 11) shows, the more one reduces distance at first, even within small values, the greater is the tendency to detrimental discernible pleat formation until one arrives at a critical point beyond which this tendency begins to diminish and finally becomes imperceptible. To my knowledge, others, not appreciating this principle and, hence, believing that shortening the length of the zone of action would only increase the troublesome pleat formation, have maintained long distances with or without lateral mechanical support.

In seeking to operate in that portion of the curve where $l$ approaches very close to 0 and buckling is avoided, I have discovered an improved technique and means by which I may operate at the desired point and by means of which successive fabric portions of extremely short lengths $l$ may be releasably held so that each of the successive fabric portions referred to may, in turn, constitute a columnar sheet. With such a method of releasably holding successive fabric lengths as columnar sheets, it is found that very large compacingt forces may be confined and continuously applied to a moving web of fabric while the fabric is, in effect, being held along two spaced-apart areas of engagement at any given time. This imparts practicality to the method from a commercial standpoint, i. e., makes possible a continuous fabric feed and provides for desired compaction, as noted in Fig. 12.

The method generally consists of feeding short lengths of suitably conditioned fabric against retardation forces which are distributed along a transversely extending line and which act in a direction substantially opposite to the travel of the fabric and against one surface only of the fabric. Feeding is accomplished by simultaneously engaging two opposite sides of the fabric along transversely extending indented areas of contact which provide a line of resistance forces spaced a very short distance in front of the line of retardation forces, as noted in Fig. 6.

It will be apparent that, by means of this method, successive portions of a moving web or sheet of fabric will be subjected simultaneously to forces of retardation and forces of resistance acting in opposition to one another, and these retardation forces and resistance forces cooperate to provide compacting strains confined to act along an extremely short length of fabric in opposed spaced-apart relationship, and the short lengths of fabric lying between the lines or zones of retardation and resistance constitute columnar sheets as above described.

I have further found that my improved method may be controlled in a highly precise manner to deal with various types of fabrics and to produce differing degrees of change in textile characteristics of the fabrics. I accomplish this by regulating the intensity of the forces of retardation as well as the forces of resistance and also by adjusting the indentation and spacing of the line of resistance forces relative to the line of retardation forces.

In this respect also, I find I may regulate the forces of retardation and the spacing therefrom of the line of resistance forces to exert on successive portions of the fabric occurring therebetween compacing forces which are less in magnitude than the resistance to buckling of the respective intervening fabric portions, but which are still of a magnitude sufficient to cause satisfactory linear compaction.

The means which I have devised for carrying out mechanical compacting in the manner above described includes a special roll compacting and fabric indentor apparatus by which I am enabled to releasably hold extremely short succeeding lengths of fabric in positions so restricted that opposing forces may be exerted on these short lengths in the plane of the fabric without permitting the fabric to buckle. This special apparatus is illustrated in the accompanying drawings, in which:

Fig. 7 is a photomacrograph of a section of fabric as it normally occurs in a woven state;

Fig. 8 is another photomacrograph of a section of the same fabric as it appears after having been subjected to the preshrinking operations of the invention;

Figs. 9 and 10 are also photomacrographs of comparative fabric samples before and after compacting respectively;

Fig. 11 is a graph showing a series of curves which indicate, for specific fabrics, the relationship between pleating occurrence and fabric length as reflected by the spacing of the fabric indentor element from the roll members of Fig. 5 and revealing especially the sharply peaked criticality region;

Figure 12:
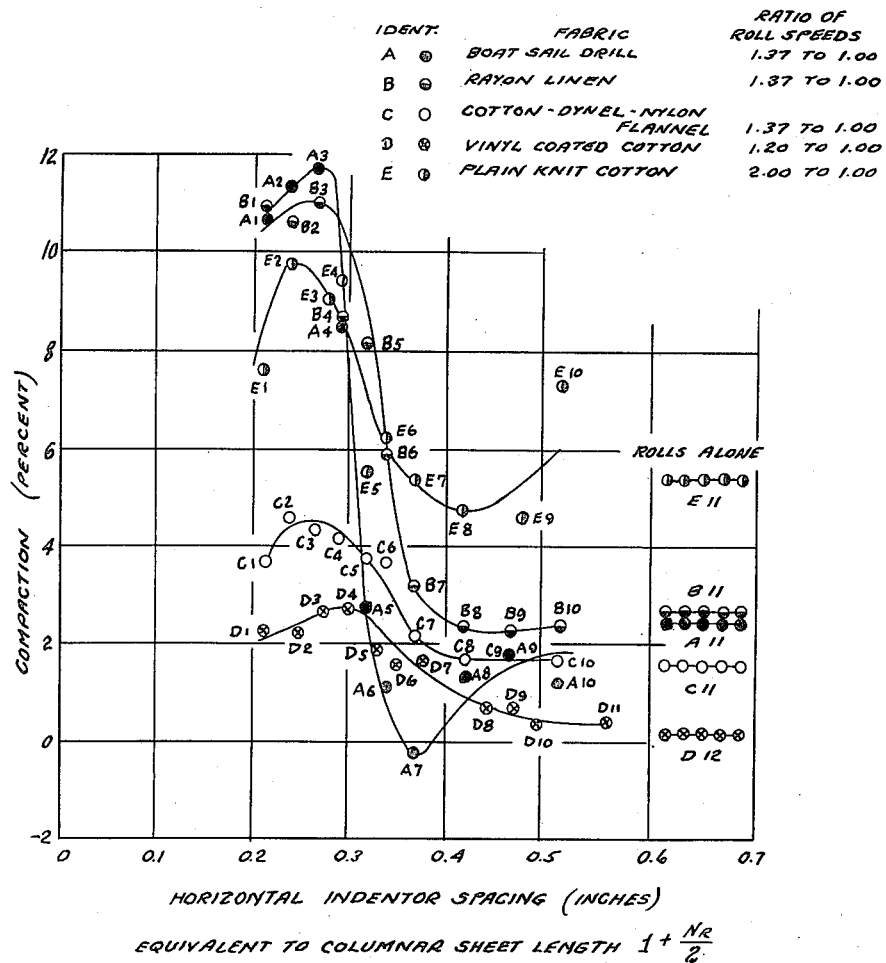
Fig. 12 is a graph somewhat similar to that of Fig. 11 and illustrating measured percentage compacting observed in a variety of fabrics and further showing the critical relationship between the degree of compacting and the linear dimension of the compacting zone.

Figs. 13–17, inclusive, are photographs of fabric samples from which were taken the values plotted in Fig. 12.

The principal parts of the compacting apparatus shown in the drawings comprise three basic components, namely, a driving roll assembly embodying such mechanical characteristics that a unit length of fabric tends to be transported along its periphery in a given time interval; a retardation roll assembly embodying such mechanical characteristics that less than a unit length of fabric tends to be transported in the same given time interval, which retardation roll is supported in slightly spaced relation to the driving roll to provide a roll nip; and a resistance means preferably consisting of a fabric indenting mechanism which is conveniently referred to as a fabric indentor element. This fabric indentor element is arranged to bear against and indent the fabric so as to force it against the driving roll at an extremely short distance in front of the entrance to the nip formed by the retardation roll and the driving roll.

In one preferred arrangement in which a roll of yieldable nature is employed as the driving roll, the indentor element operates to indent both the fabric and the adjacent roll surface against which the fabric is forced.

Preferably, the peripheral surfaces of the driving roll and the retardation roll are so provided that the total friction of the fabric against the driving roll is less than the total friction of the fabric against the retardation roll. One suitable means of accomplishing this is to provide the retardation roll with a peripheral surface having a higher coefficient of friction than that of the driving roll. As a result, the retardation roll operates to continuously exert a retarding force all along its area of contact with the fabric passing between itself and the driving roll.

For convenience, this area of contact at any given instant may be regarded as a transversely extending line or area along which retardation forces are exerted (Fig. 6), and the term "line of retardation forces," as employed throughout the specification, is intended to refer to and define this area or line of contact of the retardation roll with the fabric portion moving between said retardation roll and the driving roll.

Similarly, the resistance means or fabric indentor element, as just above noted, indents the fabric and presses it into the driving roll with a substantial force all along the line of contact. Since the line of contact noted is located very close to the line of retardation forces above described, it will be apparent that resistance forces will be exerted all along the line of contact of the indented fabric. These resistance forces operate to oppose or resist the retardation forces and to block transmission of the retardation forces in the fabric beyond the line of indentor contact. The term "line of resistance forces," as employed throughout this specification, is intended to refer to and define this area or line of contact of the fabric indentor with the fabric and driving roll. It is pointed out that the resistance forces are derived partly from the "bite" of the fabric indentor into the driving roll, which pinches the fabric, and partly from the forward feeding thrust of the fabric itself produced by the rotative movement of the driving roll which feeds the fabric past the edge of the indentor element.

Figure 5:
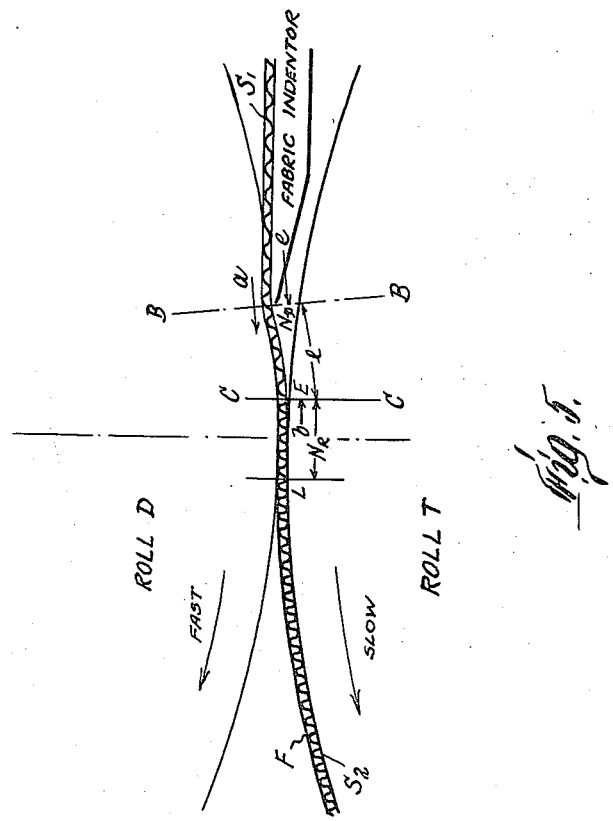
Fig. 5 is an enlarged view showing portions of a roll pair and fabric indentor apparatus and particularly indicating diagrammatically a piece of fabric being compacted.
Figure 6:
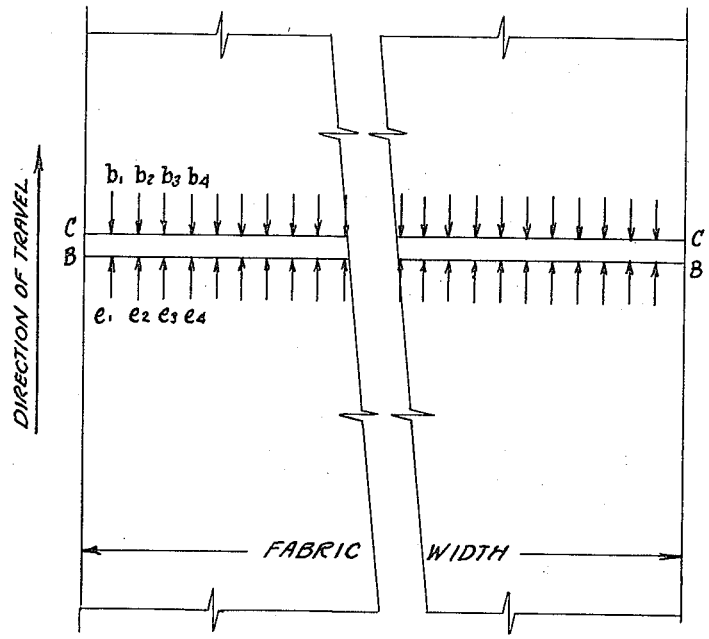
Fig. 6 is a plan view of a portion of fabric illustrating diagrammatically a short length of fabric being acted upon by compressive forces applied in opposed spaced-apart relationship in accordance with the invention.

Attention is directed to Figs. 1-6, inclusive. Figs. 1-4 illustrate one preferred embodiment of the apparatus above described, and Figs. 5 and 6 are intended to illustrate somewhat diagrammatically the actual application of competing forces by means of this apparatus to short lengths of fabric passing between a driving roll and a retardation roll.

Figure 1:
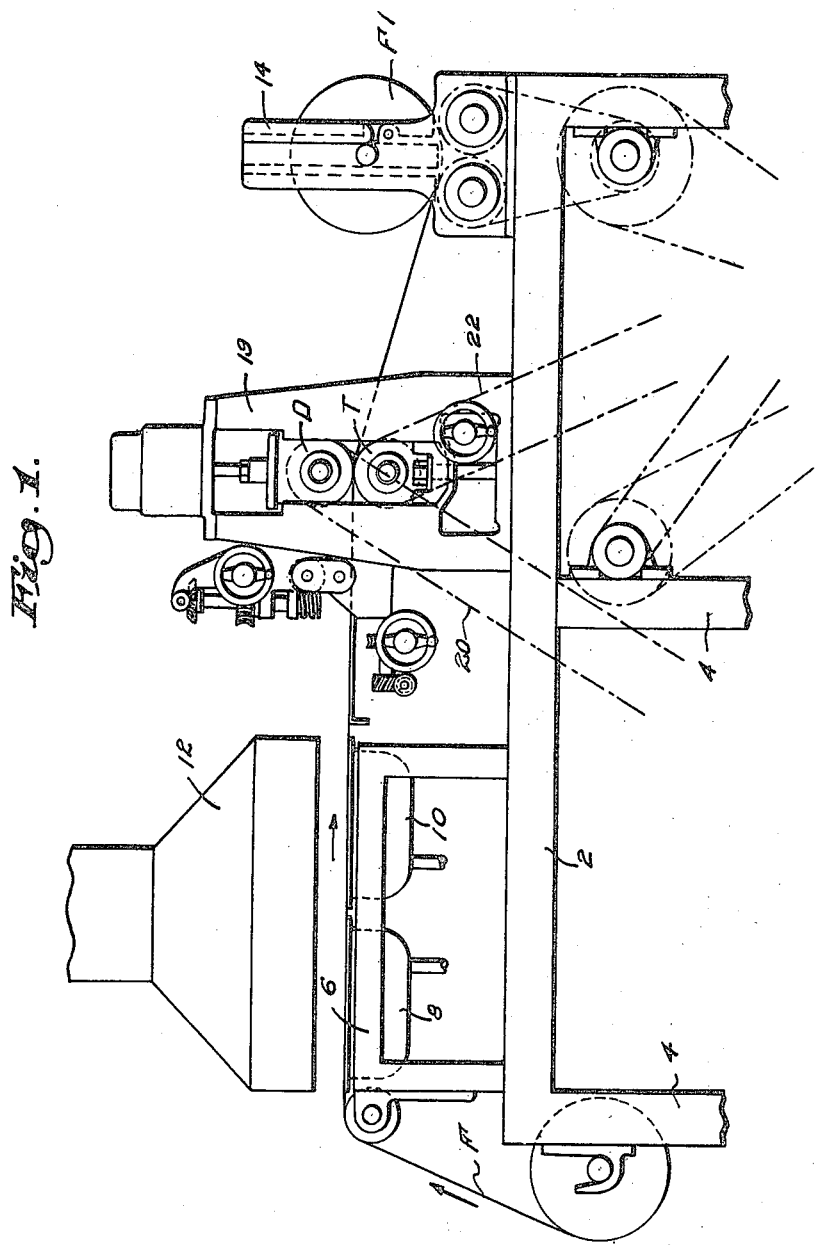
Fig. 1 is a side elevation illustrating a machine for feeding a web of cloth and subjecting it to the compacting operation of the invention.

In the structure shown in Figs. 1-4, inclusive, numeral 2 denotes an elongated frame supported in a raised position on legs 4. At the front of the frame is supported a roll of fabric F which may be free to rotate or be positively driven. It should be pointed out that this roll of fabric F may preferably be subjected to a prior moistening treatment. In Fig. 1, therefore, I have illustrated a steam table 6 equipped with steam furnishing units 8 and 10 having located thereabove exhaust hood 12.

From the steam table 6, the fabric passes through the special compacting apparatus of the invention and then is rewound in a roll F' supported in a roll stand 14 at the opposite end of the frame 2. The compacting apparatus includes a roll unit, earlier described, in which is provided a driving roll D and a retardation roll T. These rolls are arranged to rotate in slightly spaced-apart relation so as to provide a nip line with respect to a fabric passed therebetween. The rolls may, for example, be supported on suitable shafts, such as 16 and 18, mounted between uprights 17 and 19 on frame 2, as is better shown in Fig. 3. The shafts may also be independently rotated by motor-driven sprocket chains 20 and 22 which permit the retardation roll T to be rotated at a lesser surface speed than that of the driving roll D. The roll D is preferably covered with a rubber or rubber-like composition, while the roll T is provided with a peripheral surface having a higher coefficient of friction than the rubber covered roll such as may be comprised, for example, by an abrasive coating or relatively softer rubber or other materials.

Figure 2:
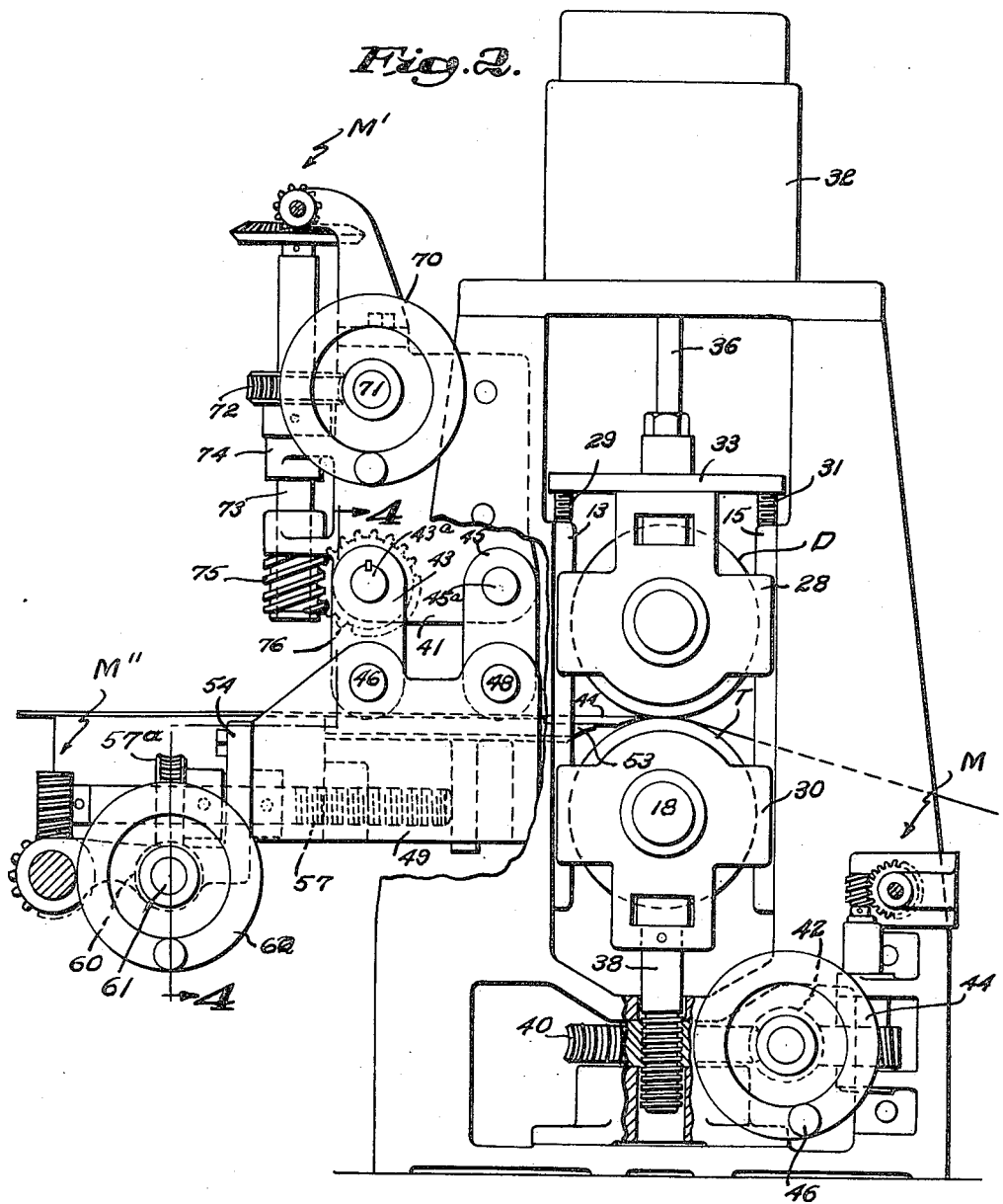
Fig. 2 is another side elevational view of the mechanism somewhat enlarged and being broken away at points to indicate the means of accomplishing critical machine settings employed therein.
Figure 3:
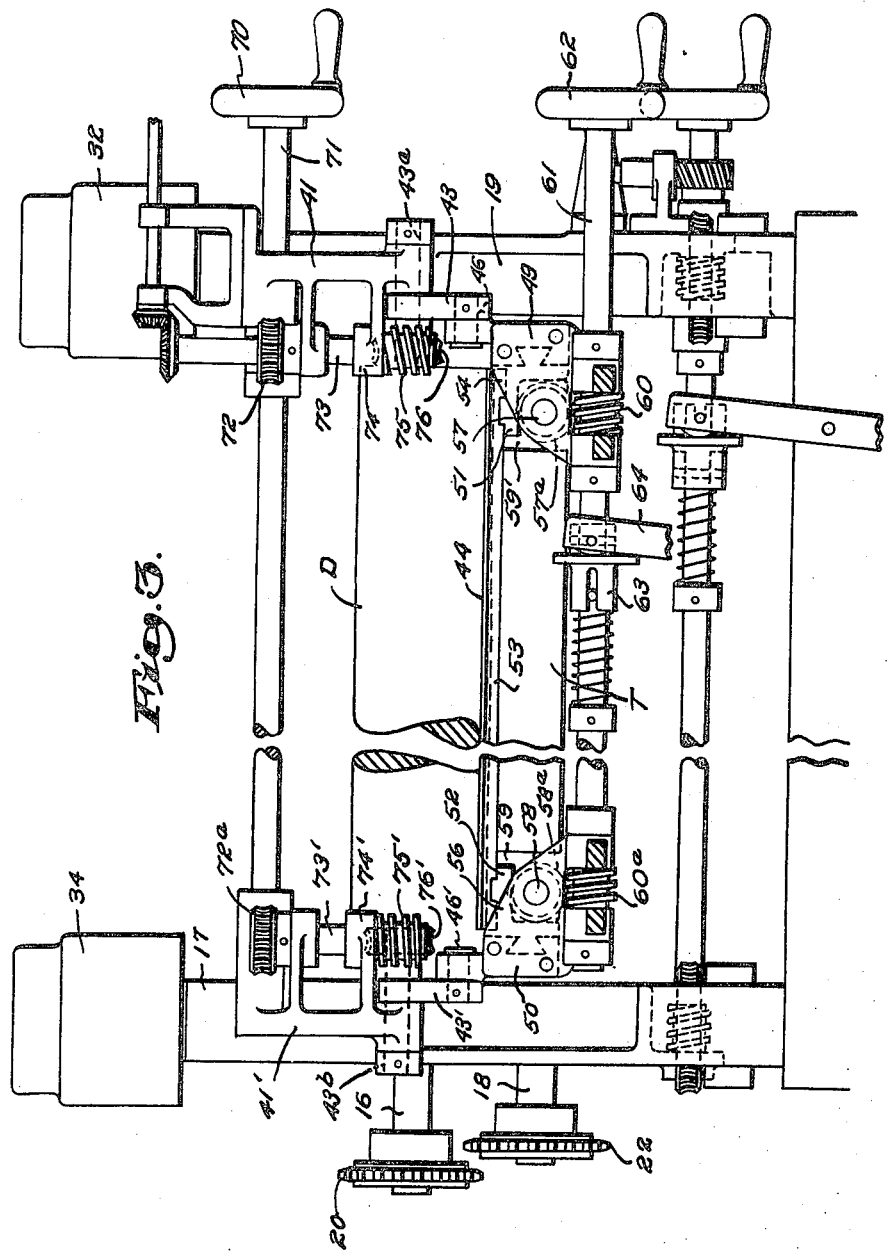
Fig. 3 is an end elevational view of the portion of the machine shown in Fig. 2 as viewed from the left-hand side thereof.
Figure 4:
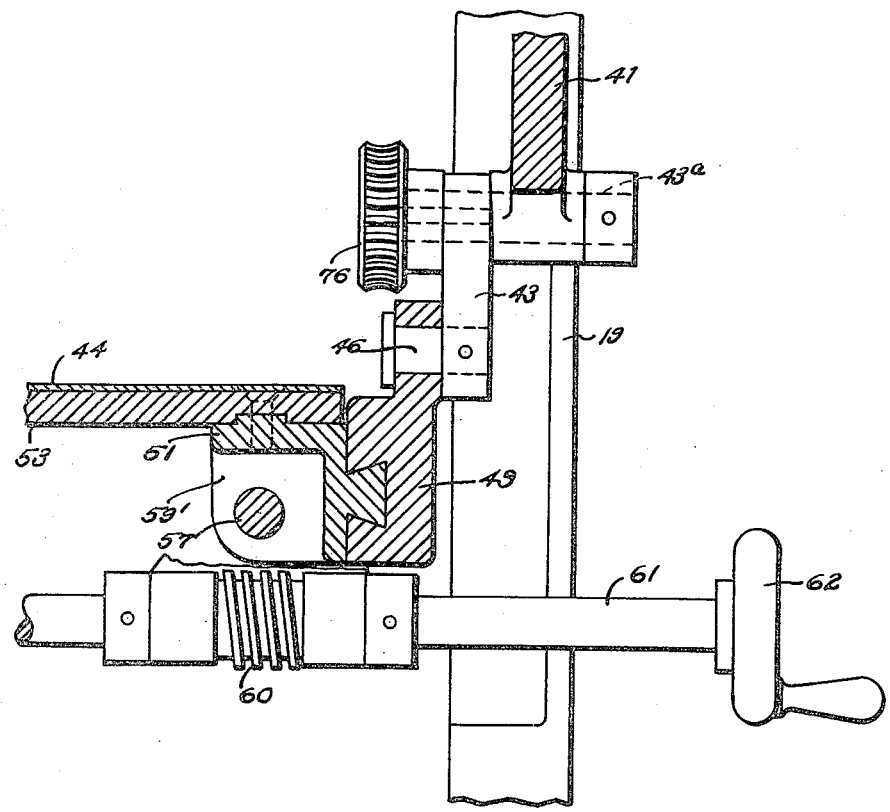
Fig. 4 is a cross-section taken on the line 4—4 of Fig. 2.

The rolls D and T are preferably provided with means for independent vertical adjustment, such as, vertically movable slides 28 and 30 (Fig. 2) through which may be received the extremities of the shafts 16 and 18. The slides 28 and 30 are arranged to be guided along rib portions 13 and 15. Some suitable vertical adjustment mechanism, such as air cylinders 32 and 34, may also be employed to operate rods as 36 (Fig. 2). A plate 33 suspended from the rods 36 carries locating screws 29 and 31, and the air cylinders operate to maintain the screws 29 and 31 against the tops of ribs 13 and 15. Similarly, the roll T may be raised and lowered by means of posts as 38 (Fig. 2), having threaded lower extremities engaged by a worm wheel 40. The wheel 40 is in turn operated, for example, by a worm 42 fixed to another wheel 44a from which extends a handle 46, as shown in the drawings.

At one side of the worm wheel 40 I may, if desired, also provide a gear driven indicator mechanism generally denoted by the letter M. Various other adjustment mechanisms may be employed to position the rolls D and T in desired positions of vertical adjustment.

In accordance with the invention, I further provide a special fabric engaging resistance mechanism which comprises a highly important feature of the invention and which includes a fabric indentor element 44 arranged to engage and force fabric portions against the surface of the roll D so that successive fabric portions become indented in the roll D as they feed across the indentor element.

The fabric indentor element 44 is preferably formed with a relatively thin tapering edge portion adapted to facilitate a pinching action on a fabric passed between itself and the roll D. It should be understood that the indentor element may be of varying sizes and contours, as well as other types of construction suitable for permitting the indentor to extend into close proximity to the line or area of contact of the roll D with a fabric passed between itself and the roll T, as suggested in Fig. 2.

An important feature of this fabric indenting mechanism is means for varying the spacing of the indentor relative to the fabric nip line of rolls D and T along a horizontal plane, and also means for moving the blade in an arcuate path. As an example of one suitable adjustment mechanism for movement of the element 44 in a horizontal plane, I provide extension pieces as 41 and 41'. Pivoted at the lower portions of these two extension members 41 and 41' on shafts as 43a, 45a and 43b are parallel links as 43, 43' and 45 (Fig. 2). Located through the lower ends of the two pairs of links 43 and 45 are stub shafts 46 and 48 which have pivotally suspended therefrom channeled side frames 49 and 50. Slidably supported between these channeled side frames 49 and 50 are a pair of keyed angle pieces 51 and 52 which are connected together by a plate 53. Plate 53 has fixed to it the indentor element 44.

Secured to the side frame pieces 49 and 50 are bearing portions 54 and 56 through which are supported shafts as 57 and 58 which have threaded inner extremities adapted to engage in respective threaded bearing portions 59 and 59'. The shafts 57 and 58 have fixed thereto worm wheels 57a and 58a which are driven by worms 60 and 60a. Worm 60 is fixed to shaft 61, as noted in Figs. 2 and 3, and rotation of a wheel 62 operates to move one side of the plate and angle supporting structure relative to the side frame pieces 49 and 50.

The shaft 61 is formed in two parts and normally connected by means of a clutch 63 and operating lever 64. When the clutch is engaged, worm 60a at the end of shaft 61 may turn shaft 58 at the opposite side of the machine and thus provide for correctly aligning each side of the element 44 and its angle iron support structure.

It will be observed that this movement merely takes care of adjustment of the indentor 44 in a horizontal plane of movement. I also provide means for swinging the element 44 through an arcuate path of movement. This mechanism includes a wheel 70 mounted on a shaft 71 supported in the elements 41. On shaft 71 are worms adapted to drive worm wheels 72 and 72a in turn fixed to respective vertical shafts 73 and 73' carried in bearing support portions 74 and 74'. At the lower end of the shafts 73 and 73' are gears 75 and 75' which engage respective gears 76 and 76' fast on shaft 43a.

Upon rotation of the wheel 70 and shaft 71, a rotative movement of the links 43 and 43' is produced and element 44 is swung rearwardly and upwardly at the same time. The radius of turning of the links is chosen to correspond with the radius of the roll D and, therefore, the edge of element 44, for a given horizontal setting, will be moved through an arc which is concentric with the periphery of the roll D.

I may also desire to provide an indicator reading to accompany movement of the wheel 70 and a conventional gear driven indicator mechanism is shown in Fig. 2 and denoted by M'. Similarly, a gear driven indicator mechanism M" may be provided to register movement of the wheel 62.

I find that, by means of the fabric indentor mechanism and the adjustment structure described, I am enabled to releasably hold the fabric in a novel manner so that a proper feeding operation can be carried on. Also, by indenting a moving fabric into a driving roll surface at a point very close to a roll nip, I am further enabled to deal with very small fabric lengths whose dimensional characteristics are such that I may operate on an asymmetrical bell-shaped curve, as described above, at points below the criticality peak of such a curve when the length $l$ is approaching zero.

In one typical operation, the web or sheet of fabric F may be advanced, as suggested somewhat diagrammatically in Fig. 5, and entered between the driving roll D and the retardation roll T. The roll T may be rotated at a surface speed relatively slower than that of roll D. The fabric indentor element 44 is adjusted to provide a very narrow spacing of the forward edge of element 44 with respect to the area or line of contact of the rolls D and T with fabric F, as suggested somewhat diagrammatically in Fig. 6.

Introduction of a fabric of greater thickness than the spacing between the rolls D and T, in some instances at least, causes a deformation of the surface of the upper roll D and also of the lower roll surface when the lower roll is constructed with a resilient compressible material. This deformation creates an extended arcuate nip $N_R$ between the rolls D and T, the length of which is a function of the fabric thickness and fabric and roll compressional properties.

The fabric is introduced at the nip $N_P$ formed by the edge of the indentor 44 and the upper roll D, as shown in Fig. 5, and both the roll D and the fabric become indented, as shown in Fig. 5. Rotation of roll D causes the fabric to feed at the approximate speed of the upper roll D into the nip $N_R$ producing an arcuate extension of the nip which otherwise would be located at the point of true mutual tangency if no distortion occurred as a result of fabric thickness.

The fabric, in this arcuate extended nip $N_R$, is reduced in velocity by the reduced speed of the lower roll T. The velocity gradient thus produced in the fabric, while it advances from the indentor nip $N_P$ to the entrance point E of the arcuate extended roll nip $N_R$, induces compressional strains in the extremely short length of fabric $N_PE$. This length of fabric is a columnar sheet held at both ends (by nips $N_P$ and $N_R$). The position of the edge of the element 44 is preferably adjusted to create a column length such that buckling of the columnar sheet is reduced to an absolute minimum, i. e., to the point where detrimental discernible pleat formation is avoided. Under these conditions, the forces exerted by the retarded forward motion of the fabric as it advances from $N_P$ to E develop high compressional strains in the lengthwise direction of the fabric rather than bending strains which could result if the compacted section of fabric were of sufficient length to buckle.

These compressional strains result in a repositioning of the entire fabric structure, which causes a decrease in length of the fabric in the direction of travel and a growth in its thickness. The fabric, as a result of this columnar compression, assumes a more preferred geometrical relationship of warp and filling yarns. Moreover, the columnar sheet $N_PE$, during the time it is approaching the entrance to $N_R$, is rendered more susceptible to the influences of the additional strains to which it is further subjected in passing through the arcuate extended nip $N_R$. Upon entering this arcuate extended nip $N_R$, the lower surface of the fabric contacts the surface of the lower roll and, because of the higher frictional coefficient of this roll, the lower surface of the fabric is induced to travel at the lower velocity of the periphery of said lower roll. The upper surface of the fabric is induced to travel at the higher velocity of the periphery of the upper roll. Under these influences of a velocity gradient, the fabric is, therefore, additionally deformed, in the direction of its travel, in shear and compression during and immediately following its residence within the confines of the arcuate extended nip $N_R$.

Fig. 6 illustrates somewhat diagrammatically lines of engagement of the fabric surfaces by the rolls and fabric indentor, as described above. The surface S1 of the fabric F, as shown in Fig. 5, is engaged by the rubber surface of the driving roll D at the line or area of contact of the indentor element with the fabric and is fed forward with a positive thrust in the direction of arrow $a$. At the same time, the opposite surface S2 of the fabric is being subjected to forces of retardation resulting from the slower speed of the roll T and acting in the direction of arrow $b$, as indicated in Figs. 5 and 6.

Attention is directed to the fact that the retardation forces represented by arrow $b$, if allowed to be transmitted throughout an extended length of the fabric, will be rapidly dissipated and, as a result, satisfactory compacting of the fabric will not take place. However, in accordance with the invention, such a transmission of forces freely through the fabric is effectively blocked at $N_P$.

An important and essential feature of the invention resides in continuously establishing in the fabric a line of resistance forces represented by the arrow $e$, Fig. 5, which forces act in opposition to a line of retardation forces $b$ and confine all compressive strains in the columnar sheet area. These resistance forces $e$ are derived partly from the "bite" of the fabric indentor element against the surface S2 of the fabric and partly from the positive feeding thrust generated by the driving roll as it feeds the fabric over the edge of the indentor element. The net result is to continually concentrate in successive short lengths of fabric exceedingly large compacting forces. It should be understood that the retardation force $b$ actually is the resultant of a distribution of forces represented by the arrows $b1$, $b2$, $b3$, as shown in Fig. 6, extending from edge to edge of the fabric and, similarly, the resistance represented by the arrow $e$ actually is the resultant of the distribution of forces $e1$, $e2$, $e3$, etc., also extending from edge to edge of the fabric.

It will be evident from the above description that a highly important consideration is a precise positioning of the fabric indentor in terms of actual working distances which can be established and maintained to provide desired fabric lengths $l$. Tables 1 and 2, noted below at column 13, indicate in general a range of fabrics compacted with satisfactory working distances. As illustrative of typical fabric indentor spacings or settings found to be within satisfactory working limits for compacting with a driving roll diameter of four inches, for example, and appearing in Table 1, there may be cited spacings, measured between the nip $N_p$ and $O$, the point of true mutual tangency of the roll pair (Fig. 5), of from about 0.2 inch to about 0.3 inch. Good results may be obtained for some fabrics by further varying the spacing $N_pO$ within a limited range of values.

This range of values for spacing, it should be understood, will vary with different types of fabrics treated, with the thicknesses of such fabrics, and with other variables relating to the compacting apparatus itself. However, I have determined that the spacing $N_pO$ must be such that $N_pE$ is the length $l$ of a columnar sheet, as earlier defined. In Table 1, I have listed a number of fabrics which have been desirably compacted and, in each case, a fabric indentor setting has been given, as noted. In addition to the materials noted in Table 1, still other fabrics and sheet material samples (see Table 2) have also been compacted by the method of the invention.

In carrying out these determinations, there were observed, in all instances, characteristic changes in the fabric surfaces which indicated when the spacing $N_pE$ was incorrect to provide adequate buckling resistance. For example, a visible change in the physical appearance of an improperly compacted fabric is very clearly indicated by detrimental discernible pleat formation resulting from buckling and occurring along fold lines which are spaced at random and which extend transversely of the web. Detrimental discernible pleating (percent) as plotted in Fig. 11 is the additional length, expressed as a percentage of the original uncompacted fabric length, resulting from straightening but not stretching pleated compacted fabrics so as to remove only the pleats which have formed as a result of improper compacting. Indentor spacings, $N_pE$, appreciably in excess of those encompassed in the aforementioned range, either result in the formation of relatively long and widely spaced-apart lines of pleating in the fabric or in insufficient compaction. As the spacing, $N_pE$, is decreased, these lines of pleating become shorter in length and occur more closely to one another.

The effect of varying $N_pE$ spacing upon the extent of compacting is shown in the graph of Fig. 12. In general, the percent compaction first increases to a maximum and then rapidly decreases to a value closely approaching the percent compacting of the roll pair alone. This initial increase to a maximum may be explained by the fact that, as the edge of the indentor approaches the point of true mutual tangency of the roll pair, the column length approaches zero. For a zero column length thus developed, the action of compaction is limited to that produced by the roll pair alone. Thus, as the distance from the edge of the indentor to the point of true mutual tangency of the roll pair is gradually increased, the extent of compacting increases to a maximum which occurs when the position of the edge of the indentor is adjusted to create a column length such that columnar compression is uninhibited and at a maximum. As the edge of the indentor is moved further away from the point of true mutual tangency of the roll pair, the extent of compacting decreases rapidly due to the reduction in true columnar compression resulting from increasing the column length.

In some cases where extreme pleating is produced, when the indentor is withdrawn to produce excessive column length, the percent compacting decreases markedly below that produced by the roll pair alone, and then increases again to a value approaching that of the roll pair alone, as shown in Fig. 12. This can be explained by the fact that the shearing action in the arcuate extended nip zone EL tends to severely tension the portions of the fabric which are encompassed by the pleats, thereby increasing rather than decreasing its length in these portions. Thus, the increase in length offsets compaction and results in over-all reduction in length less than that which occurs where the pleating is not so severe.

The roll speed ratio may be adjusted to either increase or decrease the compacting forces in accordance with the texture and elastic properties of the particular fabric to be treated. Changes in roll speed ratios must be accompanied by compatible indentor settings for maximum compacting efficiency. However, for any selected roll speed ratio and its compatible indentor settings, the combination of the roll pair plus the indentor always yields substantially greater compacting efficiency than that produced by the same roll speed ratio of a roll pair alone.

The importance of the reduction of the column length beyond the critical point to prevent detrimental discernible pleat formation and more importantly to insure the development of maximum compression strains in the fabric along its direction of travel in order to obtain maximum compacting, is illustrated in the set of photographs shown in Figs. 13–17, inclusive, wherein strips of various fabrics have been processed on the compacting apparatus of the invention with the fabric indentor setting varied from a minimum to a maximum for a given roll speed ratio.

Further evidence of the effectiveness of the process is indicated in Table 1 depicting the extent of compacting on fabrics of various types, namely, cotton boat sail drill, viscose rayon linen, cotton blend flannel, vinyl coated cotton and plain knit cotton fabric. Comparisons have been made in this table of the effectiveness of the process versus that resulting from the use of the roll pair alone, after correcting for the shrinkage occasioned by wetting out the fabric in water prior to the compacting treatment. For the range of fabrics alluded to and for those roll speed ratios selected, it has been shown that the combination of rolls and fabric indentor produce from approximately 2 to 11 times the compacting effect produced by the rolls alone, or put another way, the addition of fabric indentor to the roll pair which creates the roll and indentor combination is responsible for from 45% to 91% of the total compacting accomplished by such a combination.

Comparison of five sets of photographs, Figs. 13–17, inclusive, of cotton boat sail drill, viscose rayon linen, cotton blend flannel, vinyl coated cotton, and plain knit cotton fabrics, respectively, with the curves on Fig. 12, is of particular interest. As has already been pointed out, the maximum compaction of a columnar sheet of fabric should occur without the development of detrimental discernible pleating of the fabric.

Each series of photographs demonstrates the effect of increasing horizontal indentor setting upon detrimental discernible pleat formation resulting from buckling. In the case of cotton boat sail drill series (A1–A12), panel A11 is a photograph of fabric wet out and passed through a roll pair only, and panel A12 is a photograph of the original fabric wet out and untreated only, i. e., not subjected to any mechanical compacting. It should be here noted that the horizontal setting of the fabric indentor is increasing with increasing panel numbers from A1 through A10, inclusive. By comparing A12 as a control, with the series A1 through A10, it is apparent that detrimental discernible pleating occurs at panel A4, and hence it would be expected that maximum compacting should take place at or near point A3 on the cotton boat sail drill curve. Furthermore, as the horizontal indentor setting increases, the effect of compacting decreases to a minimum and then increases until it approaches that of the roll pair alone. Compare point A10 with point A11. These correspond with the plots shown in Fig. 12.

For the viscose rayon linen series (B1–B12) where B11 is the result of wetting out and passing through a roll pair only, and B12 the result of wetting out only, as in the previous case for cotton boat sail drill, detrimental discernible pleating occurs at panel B4 and inspection of the graph reveals maximum compacting at or near point B3 on the viscose rayon linen curve. As the horizontal setting of the indentor increases, compacting effect decreases until it approaches that of the roll pair alone. Compare point B10 with point B11.

Similar behavior is noted for cotton blend flannel fabric series (C1–C12) where C11 and C12 are respectively wet out and passed through the roll pair only and wet out only. Detrimental pleating is first discernible at C4 and maximum compacting occurs at or near point C3 on the flannel fabric curve. As the horizontal setting of the fabric indentor increases, compacting effect decreases until it approaches that of the roll pair alone. Compare point C10 with point C11.

The vinyl coated fabric series (D1–D12) behave similarly. D12 is the result of wetting out and passing through a roll pair only, and is used as the control for comparison. Detrimental discernible pleating occurs at D5 and maximum compacting at or near point D4 on the curve. As the horizontal setting of the fabric indentor increases, compacting effect decreases until it approaches that of the roll pair alone. Compare point D11 with point D12.

In the plain knit cotton fabric series (E1–E12), panel E11 is a fabric wet out and passed through the roll pair only and panel E12 is a photograph of the original fabric wet out only. By comparing E12 as a control, with the series E1 through E10, it is apparent that detrimental discernible pleating occurs at panel E3, and hence it would be expected that maximum compacting should take place at or near point E2 on the plain knit cotton curve. Furthermore, as the horizontal plate setting increases, the effect of compacting decreases to a minimum and then increases until it approaches that of the roll pair alone. Compare point E10 with point E11.

In a properly compacted fabric, important structural reorganizations and beneficial changes are produced in the fabric as a whole and in the constituent elements thereof. Certain of these structural changes may be detected visually, some may be measured by means of mechanical measuring devices and techniques, while others such as unusual hand, improved drape and improved surface interest may be detected by visual and/or tactile methods commonly employed in the textile industry.

From the standpoint of visual inspection, attention is directed to Figs. 7–10, inclusive, which consist of photomacrographs which illustrate very clearly structural reorganizations in a fabric. For example, Figs. 7 and 8, respectively, show cotton twill fabrics with a section taken across the filling and along the warp before and after compacting by the method of the invention. It will be seen that the compacted sample is materially thicker, has softer and more open yarns which are of relatively increased diameter; also, the compacted product contains a higher warp crimp resulting in a greater warp cover. A fabric having these new textile characteristics is, I find, in a quiescent state substantially devoid of tensions and other unstabilizing influences.

Figs. 9 and 10 also show samples of cotton fabric before and after compacting, and demonstrate particularly well the striking increase in warp crimp derived from concentrating the compacting forces in accordance with the invention.

As suggested above, the compacted fabrics, after undergoing the concentrated action described, take on certain textile characteristics which may be best noted by the sense of touch and, particularly, by holding the fabric in the hand. Thus, there is readily experienced, in picking up one of these compacted samples, a distinctive, full bodied softness and drape of highly desirable nature readily appreciated by those skilled in the textile art. In this connection, an extremely important feature is found to be an enhancement of the fabric texture and appearance. As is well known to those skilled in the art of preshrinking, conventional shrinkproofing by means of blankets and rolls invariably operate to flatten out and smooth the surface of the fabric and, thus, in many cases, detract from a preferred appearance. In my compacted fabrics, however, this undesirable change in fabric texture is completely avoided and, in fact, the warp "knuckles" are rendered more distinct and the grain or texture of the fabric is raised and made more pronounced. This change in itself adds materially to the value of the fabric thus preshrunk.

In carrying out the method of the invention, it is found that there are practically no limitations present as to the type of fabric which may be processed utilizing any of the presently known textile fibers.

Of particular importance is thought to be the fact that the percentages in Table 1 showing reduction in fabric lengths are achieved by one rapid pass of the fabric through the compacting apparatus and, therefore, there is accomplished a compacting technique which is materially cheaper than those heretofore practised.

From the foregoing description of the invention, it will be evident that I have provided an improved textile material as well as an improved method and apparatus for preshrinking fabrics of various classes. In compacted goods of the invention, there may be realized increased fabric and yarn thickness, softer, fuller and more pleasing hand, significantly increased abrasion resistance, substantially increased tear resistance, no appreciable change in tensile strength, improved draping qualities, markedly increased surface interest including improved warp coverage and, in general, a product of greater value to the end user. Felts, braided fabrics, netted or knotted fabrics and twisted fabrics also may thus be improved.

Although the application of compacting forces has been described as observed by my actual working operations, no attempt has been made to explain the actual changes which take place in the fabric elements. It is believed, however, that one explanation may be based upon the "column" theory. As has been pointed out, in a short length of fabric engaged between two lines of forces, as noted, one surface of the fabric is unsupported and, therefore, may be considered as an unsupported column which is caused to take compacting forces never quite exceeding those forces which will buckle the fabric.

There appears in Table 1 evidence to support the supposition that the fabric, as it moves between the driving roll and retardation roll, changes in speed so that it undergoes periodic gripping and releasing which develops an intermittent application of impact forces which induce high compressive strains in the columnar sheet. It is not intended, however, that the invention should be limited to these explanations or suppositions.

While I have shown and described preferred embodiments of the method and apparatus of the invention, it should be understood that changes and modifications may be practiced within the scope of the appended claims, having in mind particularly modified mechanisms for releasably holding and applying compressive strains to a columnar sheet of fabric.

TABLE 1

Figure 13:
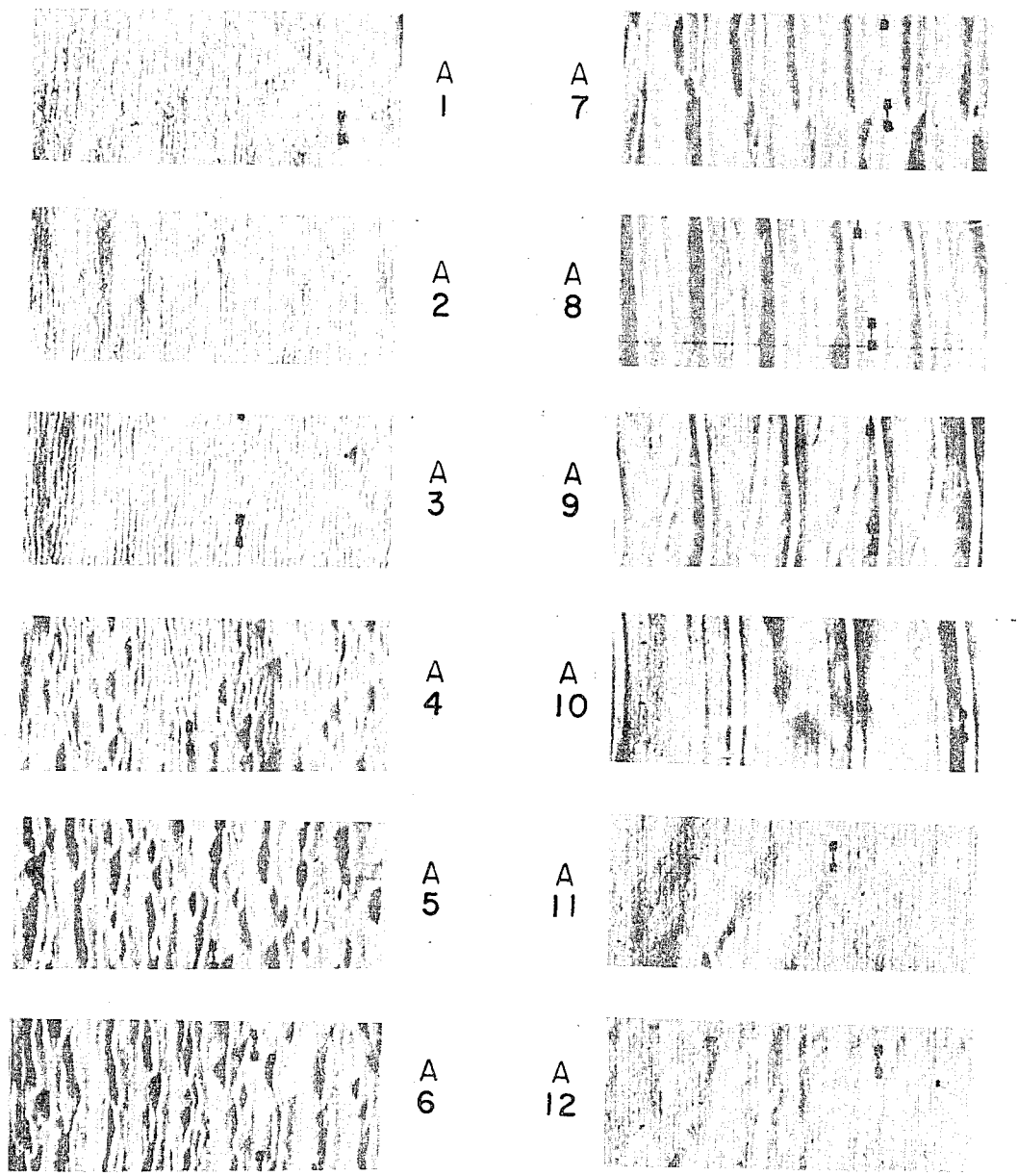
Figure 14:
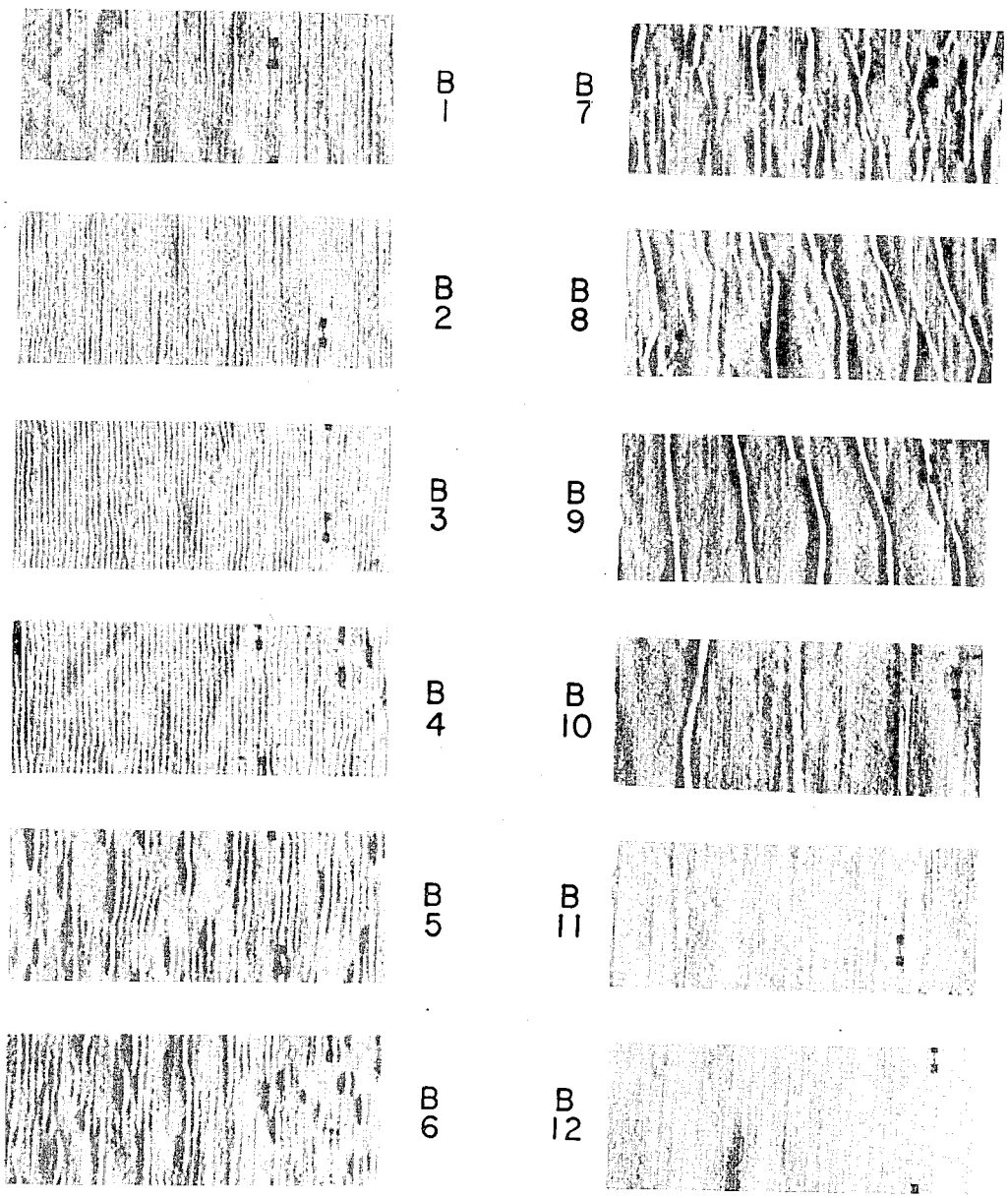
Figure 15:
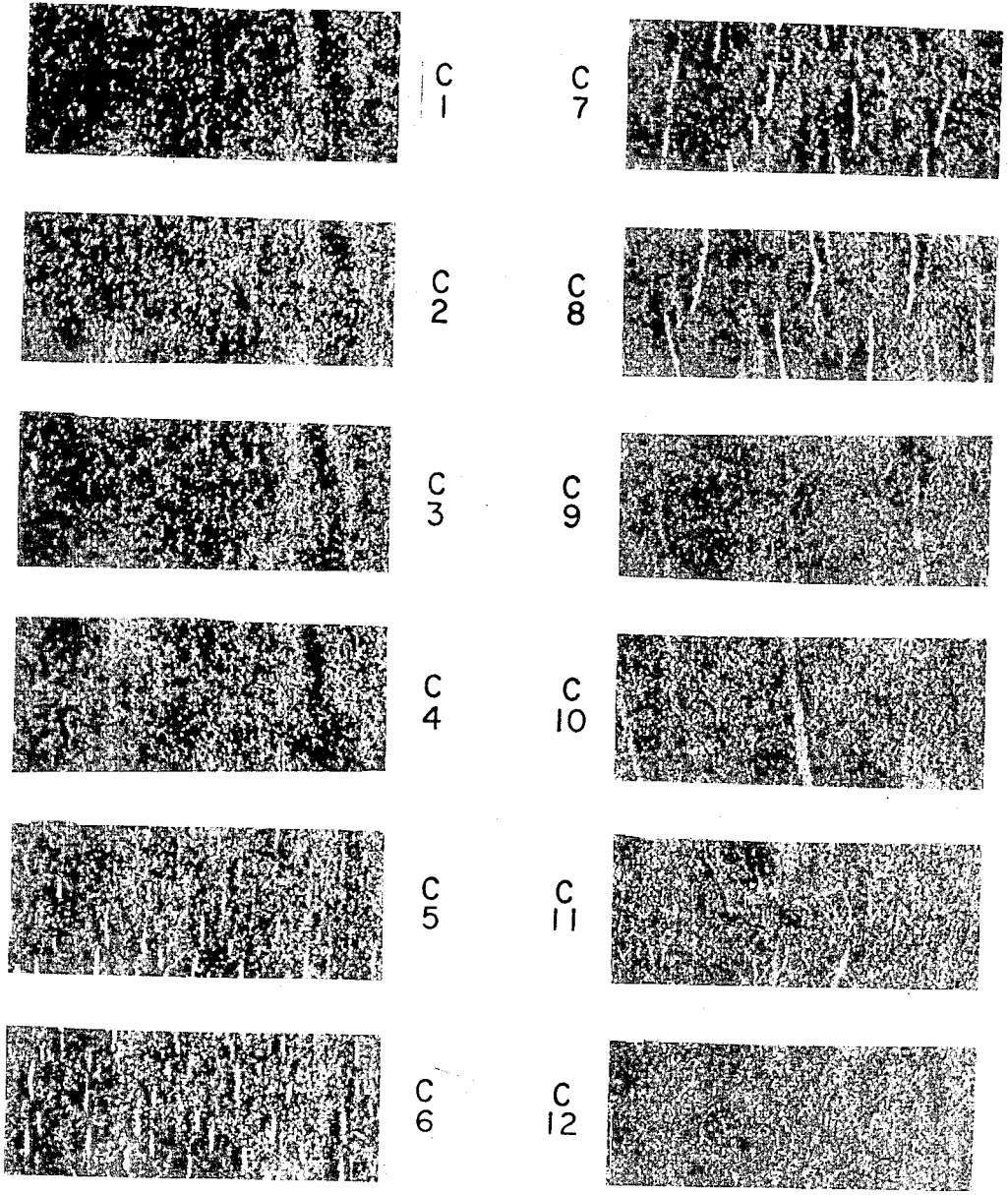
Figure 16:
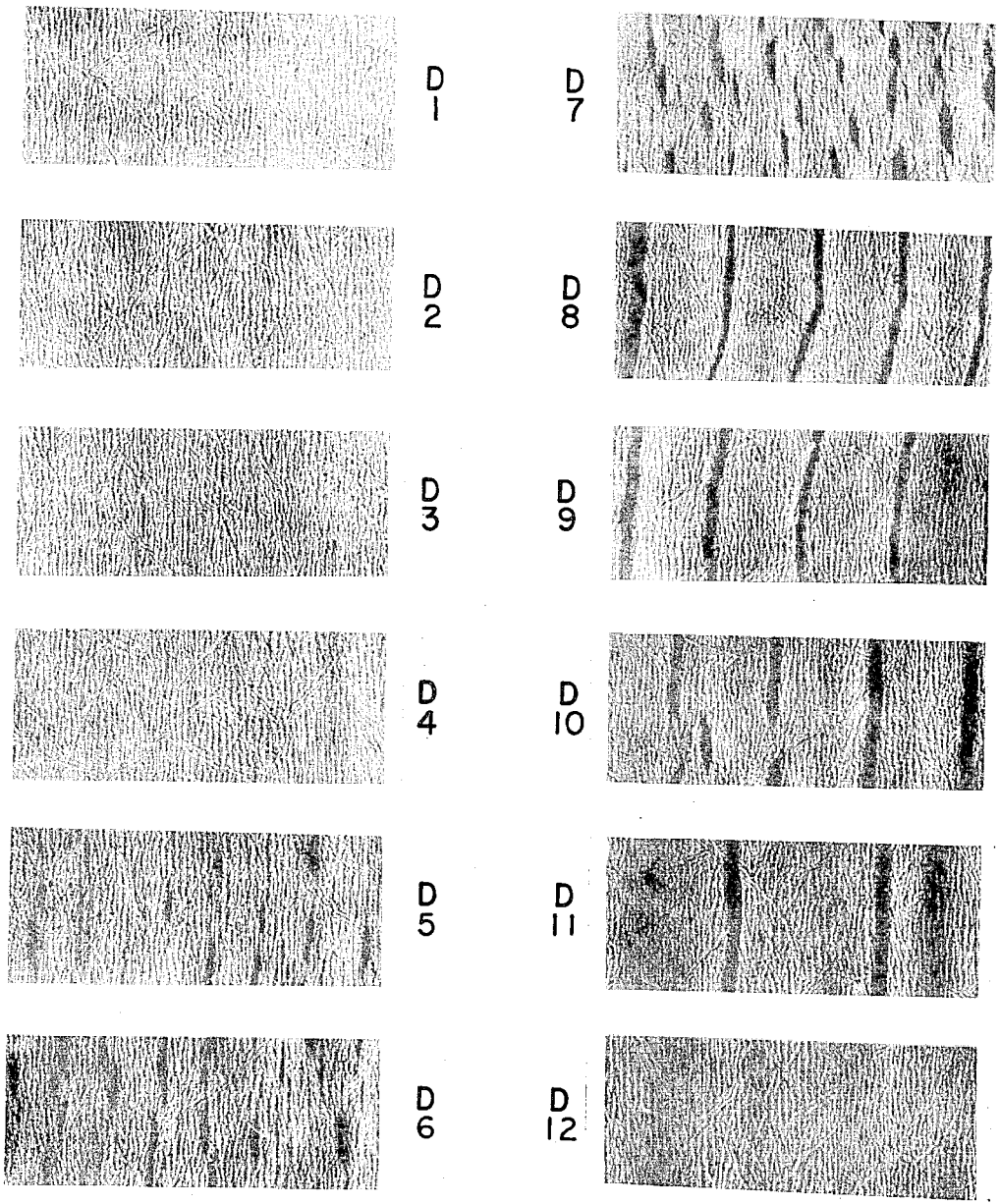
Figure 17:
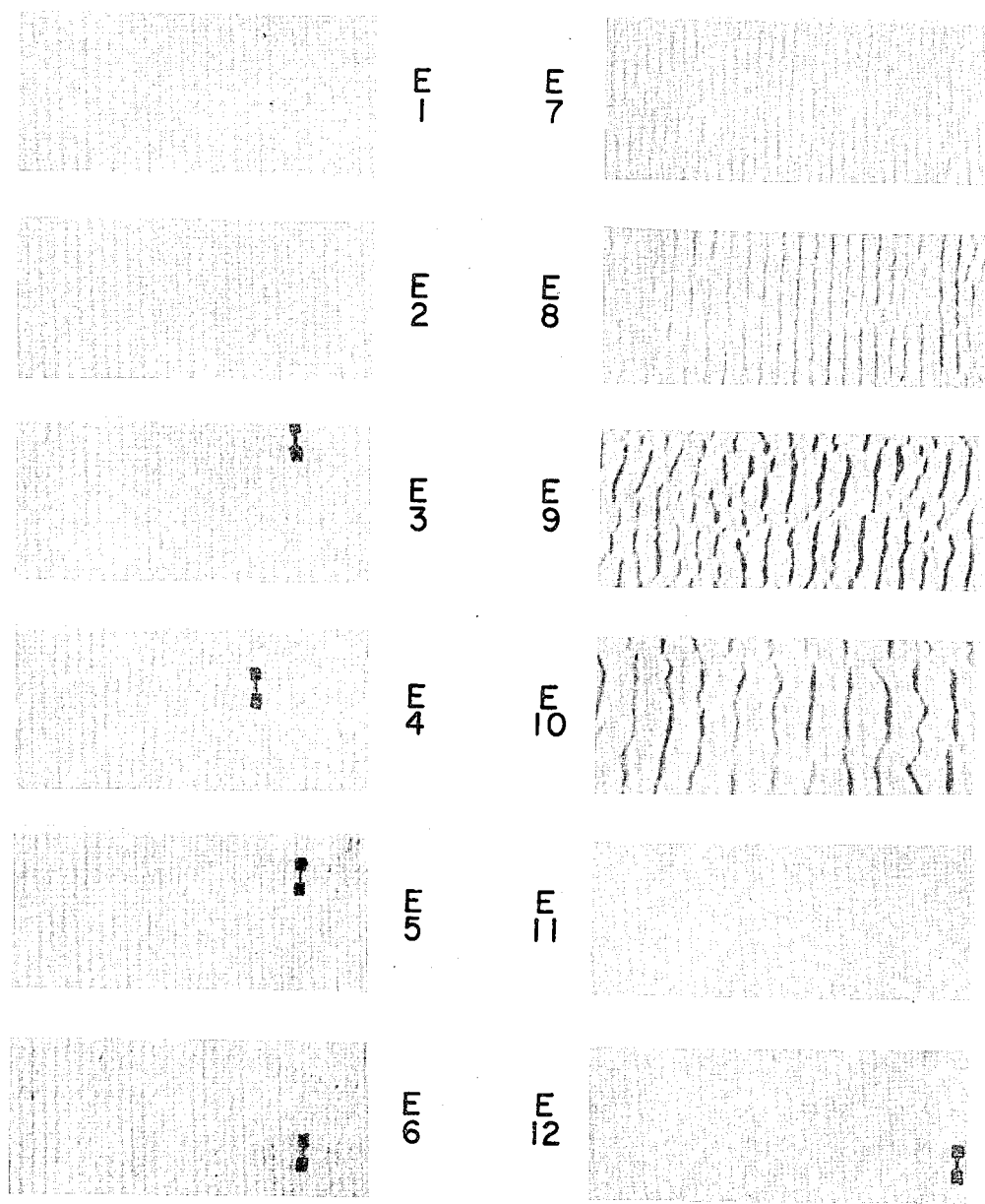

| Fabric | Boat Sail Drill | Rayon Linen | Cotton Dynel Nylon Flannel | Vinyl Coated Cotton | Plain Knit Cotton |
|---|---|---|---|---|---|
| Point on Graph Fig. 13 | A3 | B3 | C2 | D4 | E2 |
| Thickness (inches) | 0.0324 | 0.0321 | 0.0352 | 0.0368 | 0.0320 |
| Roll Speed Ratio | 1.37 to 1.00 | 1.37 to 1.00 | 1.37 to 1.00 | 1.20 to 1.00 | 2.00 to 1.00 |
| Horizontal Indentor Spacing (inches) | 0.261 | 0.261 | 0.261 | 0.298 | 0.261 |
| Maximum Percent Compacting Roll Pair Alone | 2.5 | 2.7 | 1.6 | 0.25 | 5.4 |
| Maximum Percent Compacting Roll Pair+Indentor | 11.7 | 11.0 | 4.6 | 2.75 | 9.8 |
| Percent Compacting of Roll Pair Alone Compared with Roll Pair and Indentor in Combination | 21.4 | 24.6 | 34.8 | 9.1 | 55. |
| Percent Additional Compacting Attributable to Presence of Indentor in Combination with Roll Pair | 78.6 | 75.4 | 65.2 | 90.9 | 45. |
| Improvement Factor over Roll Pair Alone | 4.7 | 4.1 | 2.8 | 11.0 | 1.8 |
| Residual Shrinkage Percent: | | | | | |
| Control— Warp | −7.3 | −5.4 | −3.2 | −3.0 | −7.0 |
| Filling | −4.8 | −4.2 | −3.5 | | −9.2 |
| Compacted— Warp | +1.7 | +2.8 | +0.2 | 0.0 | −1.4 |
| Filling | −0.4 | +4.6 | +1.8 | | −3.1 |

(−) Shrinkage.   (+) Growth.

TABLE 2
*Percent residual shrinkage*

| Fabric type | Control | | Compacted | |
|---|---|---|---|---|
| | Warp | Filling | Warp | Filling |
| Wool/Orlon Suiting | −4.9 | −4.2 | −0.7 | 0.0 |
| Viscose/Acetate Shirting | −3.6 | −1.5 | −0.3 | −0.8 |
| Viscose Linen | −3.3 | −5.8 | −0.1 | 0.0 |
| Viscose/Acetate Suiting | −4.0 | −3.0 | +0.2 | −0.9 |
| Cotton/Dynel/Nylon Suiting | −3.2 | −3.5 | +0.2 | +1.8 |
| Cotton Bedspread | −13.8 | −2.8 | +0.4 | −4.0 |
| Cotton Upholstery | −7.5 | −3.5 | −1.9 | −1.3 |
| Vinyl Coated Cotton | −3.0 | | 0.0 | |
| Orlon/Viscose Twill | −2.3 | −0.5 | −0.3 | −0.7 |
| Cotton Corduroy | −4.2 | −1.4 | +2.3 | 0.0 |
| Viscose Plissé | −2.8 | 0.0 | +3.4 | +1.0 |
| Cotton Plissé | −4.2 | −2.2 | 0.0 | +1.0 |
| Cotton Broadcloth | −2.8 | +3.2 | −0.1 | 0.0 |
| Cotton Plain Knit | −7.0 | −9.2 | −1.4 | −3.1 |
| Viscose/Cotton Diaper | −7.3 | −0.8 | +0.8 | −1.2 |
| Axminster Rug | −6.3 | | −1.0 | |
| Boat Sail Drill | −7.3 | −4.8 | +1.7 | −0.4 |

(−) Shrinkage.   (+) Growth.

I claim:

1. Apparatus of the character described comprising means providing a continuous material-gripping surface movable through an endless path, a power drive associated therewith for moving said surface at a uniform rate of speed through said path, and mechanism for continuously feeding a continuous length of flexible, longitudinally reformable material towards said gripping surface at a uniform speed greater by a predetermined increment than the speed of said gripping surface to a point of advance close to said gripping surface and beyond which it undergoes an abrupt reduction in speed during its travel between said point of advance and the line of its first engagement with said gripping surface, said mechanism including means providing a continuous material-feeding surface opposed to said gripping surface and also movable through an endless path, said path having a section in which said material-feeding surface converges towards said gripping surface and into at least transient parallelism therewith, a power drive in driving relation to said last-named means for moving said material-feeding surface at a uniform rate of speed greater than that of said gripping surface, said mechanism also including an indentor element having an edge extending transversely across said feeding surface and arranged to permit said material to pass between said edge and said feeding surface, said element having a narrow material-pressing portion adjacent said edge, and supporting means adjustably holding said element so that only said narrow portion presses the advancing material into positive non-slip frictional feeding engagement with said material-feeding surface only along a fixed line spaced closely in advance of said line of first engagement of said material with said gripping surface, the zone beyond said edge in the direction of said gripping surface and through which the material travels while it is undergoing said change of speed being a void defined solely by said moving surfaces, said surfaces through at least a portion of said zone being spaced apart a sufficient distance so that said material may expand in the direction of its thickness substantially unconfined by said surfaces as said material undergoes said abrupt reduction in speed.

2. Apparatus as claimed in claim 1, wherein the indentor element is a thin beveled-nose plate lying in a plane substantially parallel to said plane of parallelism.

3. Apparatus as claimed in claim 1, wherein the coefficient of friction of said material-feeding surface is less than that of said material-gripping surface.

4. Apparatus as claimed in claim 1, wherein said surfaces are surfaces of opposed rolls forming a nip therebetween.

5. Apparatus as claimed in claim 1, wherein said indentor element is a thin beveled-nose plate lying in a plane substantially parallel to the plane of such parallelism and including mountings for said plate permitting adjustable movement thereof in the plane in which it lies toward and away from said line of first engagement of the material with said gripping surface.

6. Apparatus as claimed in claim 1, wherein said indentor element is a thin beveled-nose plate lying in a plane substantially parallel to the plane of such parallelism and including mountings for said plate permitting adjustable movement thereof in a plane normal to the plane in which it lies.

7. Apparatus as claimed in claim 1, wherein said material-feeding surface is the surface of a roll and wherein said supporting means includes mountings for said indentor element permitting adjustable movement thereof in an arcuate path concentric with said roll surface.

8. Apparatus as claimed in claim 1, wherein said material-feeding surface is the surface of a roll and wherein said supporting means includes mountings for said indentor element permitting adjustable movement thereof toward and away from said roll surface.

9. Apparatus as claimed in claim 1, wherein said supporting means comprises a carrier member on which said indentor element is mounted and wherein said apparatus includes a pair of side frames for slidably supporting said carrier member, suspension links attached to said side frames and a structure pivotally mounting the said suspension links whereby said indentor element may be adjusted in an arcuate path corresponding to the curvature of said material-feeding surface.

10. Apparatus of the character described comprising means providing a continuous material-gripping surface movable through an endless path, a power drive associated therewith for moving said surface at a uniform rate of speed through said path, and mechanism for continuously feeding a continuous length of flexible, longitudinally deformable material towards said gripping surface at a uniform speed greater by a predetermined increment than the speed of said gripping surface up to a point of advance close to said gripping surface and beyond which it undergoes an abrupt reduction in speed without buckling during its travel between said point of advance and the line of its first engagement with said gripping surface, said mechanism including means providing a continuous material-feeding surface opposed to said gripping surface and also movable through an endless path, said path having a section in which said material-feeding surface converges towards said gripping surface and moves into at least transient parallelism therewith, a power drive in driving relation to said last-named means for moving said material-feeding surface at a uniform rate of speed greater than that of said gripping surface, said mechanism also including a blade having an edge extending transversely across said material and arranged to permit said material to pass between said blade and said feeding surface, said blade having a narrow material-pressing portion adjacent said edge and supporting means adjustably holding said blade so that only said narrow portion presses the advancing material into positive non-slip frictional feeding contact with said material-feeding surface along a fixed line spaced in advance of the midpoint of said section by a distance, projected along the plane of such parallelism, not exceeding 0.3 inch, the zone beyond said edge in the direction of said gripping surface and through which the material travels while it is undergoing said change of speed being a void defined solely by said moving surfaces, said surfaces through at least a portion of said zone being spaced apart a sufficient distance so that said material may expand in the direction of its thickness substantially unconfined by said surfaces as said material undergoes said abrupt reduction in speed.

11. Apparatus of the character described comprising a first roll having a material-gripping surface, a drive in driving connection to said roll for revolving said surface at a uniform rate of speed, a second roll mounted in parallel, at least closely spaced, relation to said first roll, the surface thereof constituting a feeding surface, a drive in driving connectiton to said second roll revolving said feeding surface at a uniform speed greater by a predetermined increment than the speed of the gripping surface, said surfaces converging toward and moving in the same direction as each other to form a nip therebetween, a thin beveled-nose plate mounted with its forward edge parallel with and closely adjacent said nip and arranged to permit a continuous length of flexible longitudinally deformable material to pass between said edge and said feeding surface to said nip, said plate having a narrow material-pressing portion adjacent said edge, and mountings for said plate holding the same so that only said narrow portion presses the advancing material into positive non-slip frictional feeding engagement with said material-feeding surface only along a fixed line spaced closely in advance of the line defined by said nip, the zone beyond said edge in the direction of said nip being a void defined solely by said moving surfaces through which the material travels and wherein it undergoes an increment of speed change between that of said feeding surface and that of said gripping surface, said surfaces through at least a portion of said zone being spaced apart a sufficient distance so that said material may expand in the direction of its thickness substantially unconfined by said surfaces as said material undergoes said increment of speed change.

12. Apparatus as claimed in claim 11, wherein said mountings for said plate are adjustable, said mountings including means permitting adjustment of said plate in a path normal to a plane mutually tangent to said surfaces at said nip.

13. Apparatus as claimed in claim 11, wherein said mountings for said plate are adjustable, said mountings including means permitting adjustment of said plate in a path parallel to a plane mutually tangent to said surfaces at said nip.

14. Apparatus as claimed in claim 11 wherein said mountings for said plate are adjustable, said mountings having parallel links pivotally mounted to swing about an arc of travel having the same radius as that of said feeding roll, permitting adjustable movement of said plate toward and away from said nip through an arcuate path corresponding to the curvature of said feeding roll.

15. Apparatus as claimed in claim 11 in which at least one of said rolls is composed of yieldable material.

16. Apparatus as claimed in claim 11, wherein said rolls are mounted for adjustment toward and away from each other.

17. Apparatus as claimed in claim 11, including a moistening unit for applying a modifying agent to said deformable material in advance of said forward edge of said plate.

References Cited in the file of this patent

UNITED STATES PATENTS

| | | |
|---|---|---|
| 2,078,721 | Scanlon | Apr. 27, 1937 |
| 2,199,011 | Schreiner | Apr. 30, 1940 |
| 2,263,712 | Wrigley et al. | Nov. 25, 1941 |